United States Patent
Park et al.

(10) Patent No.: US 9,369,901 B2
(45) Date of Patent: Jun. 14, 2016

(54) METHOD FOR COLLECTING INFORMATION BY ELECTRONIC DEVICE AND ELECTRONIC DEVICE THEREFOR

(71) Applicant: Samsung Electronics Co., Ltd., Gyeonggi-do (KR)

(72) Inventors: Seong-Hee Park, Seoul (KR); Jae-Eun Kang, Gyeonggi-do (KR); Han-Su Kang, Seoul (KR); Sung-Il Park, Gyeonggi-do (KR); Bong-Jhin Shin, Gyeonggi-do (KR); Chil-Youl Yang, Gyeonggi-do (KR); Myoung-Hwan Lee, Gyeonggi-do (KR); Jang-Hee Lee, Gyeonggi-do (KR); Chun-Ho Lee, Gyeonggi-do (KR); Tae-Young Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/626,476

(22) Filed: Feb. 19, 2015

(65) Prior Publication Data
US 2015/0237515 A1    Aug. 20, 2015

(30) Foreign Application Priority Data
Feb. 19, 2014    (KR) .......................... 10-2014-0019011

(51) Int. Cl.
*H04W 24/08*    (2009.01)
*H04W 8/00*    (2009.01)

(52) U.S. Cl.
CPC .............. *H04W 24/08* (2013.01); *H04W 8/005* (2013.01)

(58) Field of Classification Search
CPC ............................. H04W 24/08; H04W 8/005
See application file for complete search history.

(56) References Cited

U.S. PATENT DOCUMENTS

| | | | |
|---|---|---|---|
| 2006/0152477 A1* | 7/2006 | Noda et al. ..................... | 345/156 |
| 2006/0240774 A1 | 10/2006 | Blom et al. | |
| 2008/0154714 A1 | 6/2008 | Liu et al. | |
| 2012/0184311 A1* | 7/2012 | Yamamoto et al. ........... | 455/502 |
| 2013/0060627 A1 | 3/2013 | Harrison | |
| 2013/0275198 A1 | 10/2013 | Zeto, III et al. | |
| 2013/0310082 A1 | 11/2013 | Takaoka | |
| 2014/0220895 A1* | 8/2014 | Wei et al. ..................... | 455/41.2 |
| 2015/0289125 A1* | 10/2015 | Van Phan et al. ............. | 455/434 |

OTHER PUBLICATIONS

Bin Xu et al., "Using Physical Context in a Mobile Social Networking Application for Improving Friend Recommendations", 2011 IEEE International Conferences on Internet of Things, and Cyber, Physical and Social Computing, Oct. 19, 2011, 8 pages.
Upendra Rathnayake et al., "Environmental Context Aware Trust in Mobile P2P Networks", 36th Annual IEEE Conference on Local Computer Networks, Oct. 4, 2011, 9 pages.
European Search Report dated Jul. 6, 2015 issued in counterpart application No. 15155690.9-1854, 13 pages.

* cited by examiner

*Primary Examiner* — Leon Flores
(74) *Attorney, Agent, or Firm* — The Farrell Law Firm, P.C.

(57) ABSTRACT

A method of an electronic device and a method of a server are provided. The method of the electronic device includes receiving a broadcast signal broadcast by another electronic device via a wireless communication; determining, based on the received broadcast signal, a number of times the another electronic device has been detected; and sending a request for information to the another electronic device, based on the determined number of times the another electronic device has been detected. The method of the server includes receiving information from a first electronic device; receiving, from a second electronic device, an information request message relating to the first electronic device which has been detected a threshold number of times or more by the second electronic device; and transmitting information registered by the first electronic device to the second electronic device.

26 Claims, 13 Drawing Sheets

METHOD FOR COLLECTING INFORMATION BY ELECTRONIC DEVICE AND ELECTRONIC DEVICE THEREFOR

PRIORITY

This application claims priority under 35 U.S.C. §119(a) to a Korean Patent Application filed on Feb. 19, 2014 in the Korean Intellectual Property Office and assigned Serial No. 10-2014-0019011, the entire content of which is incorporated herein by reference.

BACKGROUND

1. Field of the Invention

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

The present invention relates generally to an electronic device, and more particularly, to a method and an apparatus for collecting information of another electronic device by an electronic device.

2. Description of the Related Art

With the recent development of wireless communication systems, there has been a rapid increase in electronic devices supporting wireless communication. Electronic devices supporting wireless communication can connect with and transmit or receive data to or from other electronic devices via wireless communication technology. For example, an electronic device supporting wireless communication can connect with a wireless communication server and then transmit or receive data to or from another electronic device via the wireless communication server or directly transmit or receive data to or from another electronic device.

The types of electronic devices supporting wireless communication are now diverse and popular, and users carrying electronic devices supporting wireless communication are easily found, and wireless communication electronic devices, such as a wireless communication server, are easily found in public. For example, when using public transportation, such as a subway train or bus, a user can easily find other users who are using a smart phone or a tablet Personal Computer (PC).

An electronic device may frequently encounter an electronic device or a particular communication server according to the routine of a user of the electronic device. Therefore, it is necessary to provide a service for improving the user's convenience by using the characteristics of the frequency of encounters according to a routine.

SUMMARY

The present invention has been made to address the above-mentioned problems and disadvantages, and to provide at least the advantages described below. Accordingly, an aspect of the present invention provides a method and an apparatus for collecting, by an electronic device, information of another electronic device detected a predetermined number of times or more.

Another aspect of the present invention provides a method and an apparatus for collecting and managing, by an electronic device, where the number of detections of another electronic device based on advertisement packets is received via wireless communication.

Still another aspect of the present invention provides a method and an apparatus for collecting, by an electronic device, information of another electronic device detected a predetermined number of times or more via direct connection with the another electronic device.

Still another aspect of the present invention provides a method and an apparatus for acquiring, by an electronic device, information of another electronic device detected a predetermined number of times or more from a server.

Still another aspect of the present invention is to provide a method and an apparatus for providing, by an electronic device, a service relating to another electronic device detected a predetermined number of times or more.

In accordance with an aspect of the present invention, a method of an electronic device is provided. The method includes receiving a broadcast signal broadcast by another electronic device via a wireless communication; determining, based on the received broadcast signal, a number of times the another electronic device has been detected; and sending a request for information to the another electronic device, based on the determined number of times the another electronic device has been detected.

In accordance with another aspect of the present invention, a method of a server is provided. The method includes receiving information from a first electronic device; receiving, from a second electronic device, an information request message relating to the first electronic device which has been detected a threshold number of times or more by the second electronic device; and transmitting information registered by the first electronic device to the second electronic device.

In accordance with another aspect of the present invention, an electronic device is provided. The electronic device includes a transceiving unit configured to receive a broadcast signal broadcast by another electronic device; and a controller configured to determine, based on the received broadcast signal, a number of times the another electronic device has been detected, wherein the transceiving unit is further configured to and send a request for information to the another electronic device, based on the determined number of times the another electronic device has been detected.

In accordance with another aspect of the present invention, an apparatus for a server is provided. The apparatus for a server includes a communication module configured to receive information from a first electronic device, and to receive, from a second electronic device, an information request message relating to the first electronic device which has been detected a threshold number of times or more by the second electronic device; and a controller configured to control a wireless communication unit to transmit information registered by the first electronic device to the second electronic device.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Hereinafter, embodiments of the present invention are described with reference to the accompanying drawings. Further, in the following description of the present invention, a detailed description of known functions or configurations incorporated herein are omitted when it may make the subject matter of the present invention unclear. Further, terms described below are defined in consideration of functions of the present invention, but may vary according to the intention or convention of a user or operator. Therefore, the definitions of the terms should be determined based on the contents throughout the specification.

An electronic device described hereinafter may be a device supporting a wireless communication system. For example, the electronic device may include a smart phone, a tablet Personal Computer (PC), a mobile phone, a video phone, a Personal Digital Assistant (PDA), a digital camera, an Moving Picture Experts Group Audio Layer 3 (MP3) player, a navigation device, a laptop computer or netbook, etc.

Figure 1:
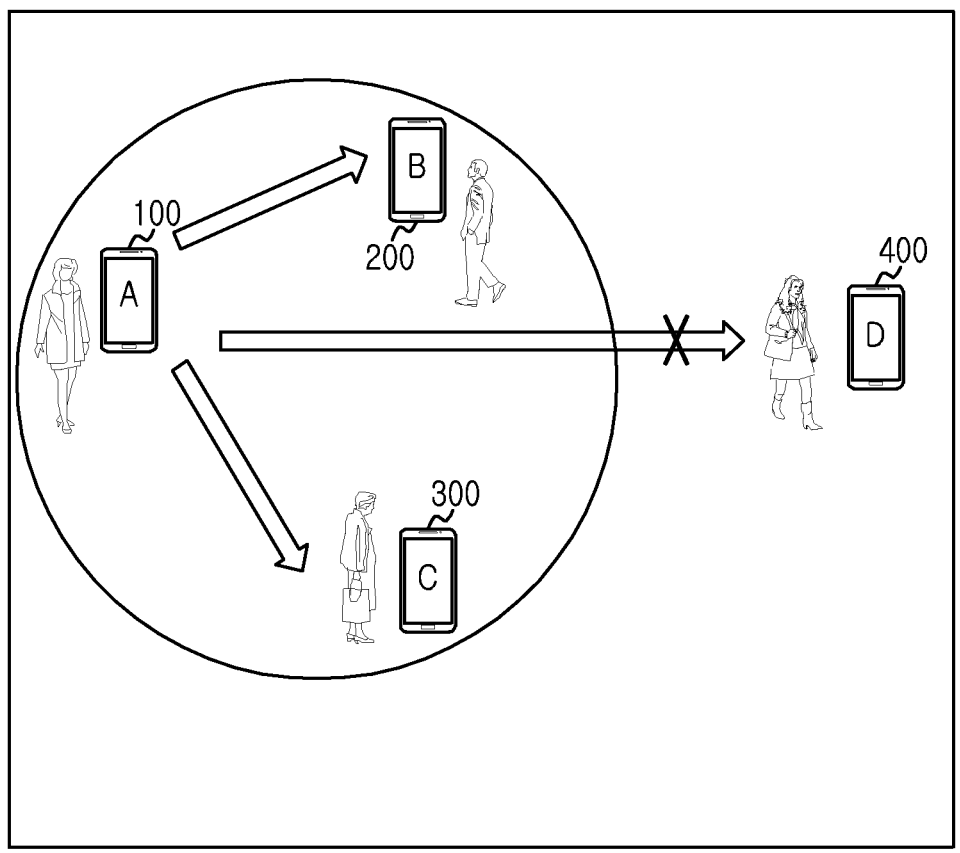
FIG. 1 illustrates an example of managing a number of detections of another electronic device according to an embodiment of the present invention.

FIG. 1 illustrates an example of managing a number of detections of another electronic device according to an embodiment of the present invention.

Referring to FIG. 1, electronic device A 100 can detect electronic device B 200 and electronic device C 300, which are located in a near distance area from electronic device A 100, via signal transmission and reception. In this case, electronic device A 100 can detect another electronic device via a wireless communication, such as Bluetooth or Wireless Fidelity (WiFi). For example, each of electronic device A 100, electronic device B 200, electronic device C 300, and electronic device D 400 can broadcast a signal, such as an advertisement packet, via a near field wireless communication. When electronic device A 100 has received an advertisement packet from electronic device B 200 and electronic device C 300, electronic device A 100 determines that electronic device B 200 and electronic device C 300 are located in a near distance area which electronic device A 100 can transmit or receive a signal to or from via a near field wireless communication. Then, electronic device A 100 stores the number of times electronic device B 200 or electronic device C 300 has been detected. For example, electronic device A 100 cumulatively stores the number of times electronic device B 200 or electronic device C 300 has been detected, whenever an advertisement packet relating to electronic device B 200 and electronic device C 300 is received. If an advertisement packet has been received from electronic device B 200 and electronic device C 300 in a state where the number of detections of electronic device B 200 is two and the number of detections of electronic device C 300 is three, electronic device A 100 stores the number of detections of electronic device B 200 after increasing the number from two to three and stores the number of detections of electronic device C 300 after increasing the number from three to four.

In addition, an advertisement packet of each electronic device may be broadcasted at every cycle of a preset cycle. Therefore, electronic device A 100 may continuously receive advertisement packets from electronic device B 200 and electronic device C 300 which stay at the same position during a threshold duration. In the present invention, in preparation for such a case, an electronic device may not accumulate the number of detections of a particular electronic device whenever an advertisement packet of the particular electronic device is received. For example, when an advertisement packet from the particular electronic device is initially received, an electronic device accumulates the number of times a particular electronic device has been detected. Then, during a threshold duration from the time point when the number of times is accumulated, the electronic device disregards the number of times the particular electronic device has been detected, without accumulating or updating the number, even when another advertisement packet is received from the particular electronic device. Thereafter, after passage of the threshold duration from the time point when the number of detections of the particular electronic device is accumulated, the electronic device may accumulate the number of detections of the particular electronic device, using an advertisement packet received from the particular electronic device.

Meanwhile, since electronic device D 400 is located farther from electronic device A 100 than the distance which allows a near field wireless communication with electronic device A 100, electronic device A 100 is unable to detect electronic device D 400 and manage the number of detections of electronic device D 400.

Figure 2:
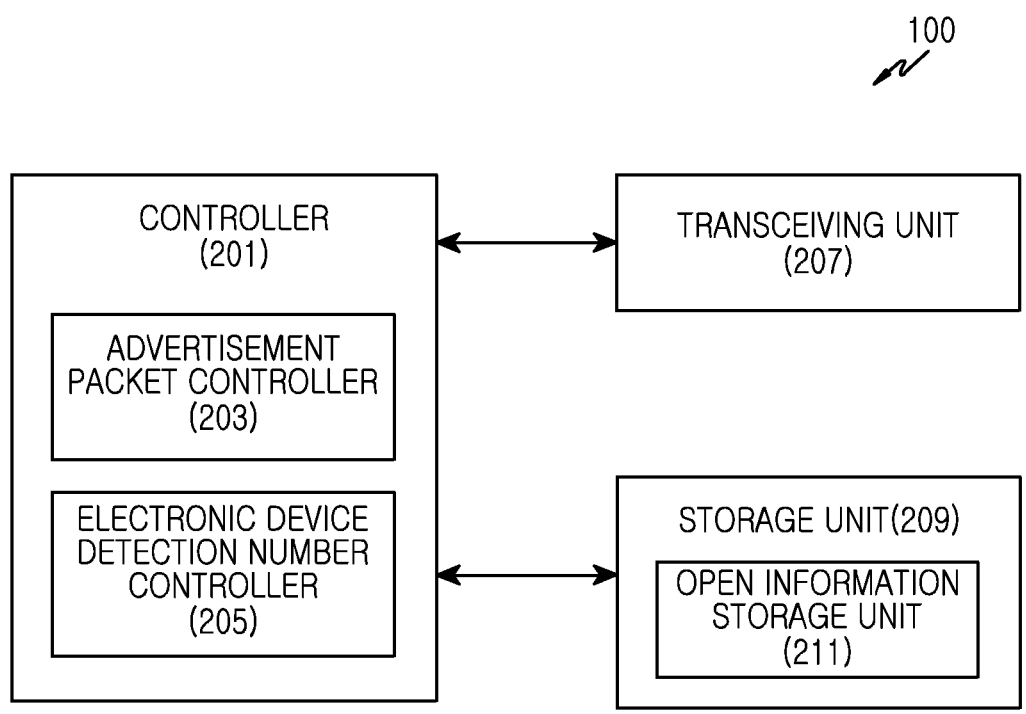
FIG. 2 is a block diagram illustrating an electronic device managing a number of detections of another electronic device according to an embodiment of the present invention.

FIG. 2 is a block diagram illustrating an electronic device 100 managing a number of detections of another electronic device according to an embodiment of the present invention.

Referring to FIG. 2, the electronic device 100 includes a controller 201, a transceiving unit 207, and a storage unit 209.

The controller 201 controls and processes general operations of the electronic device 100 for providing a service to a user and controls and processes operations for collecting information on the basis of the number of detections of another electronic device according to an embodiment of the present invention. Especially, the controller 201 includes an advertisement packet controller 203 and an electronic device detection number controller 205.

The advertisement packet controller 203 controls, via wireless communication, a function for broadcasting an advertisement packet including identification information (e.g. electronic device ID or user account information) of the electronic device 100. For example, the advertisement packet controller 203 performs a control operation to broadcast an advertisement packet including identification information of the electronic device 100 at every preset time via a wireless communication. As another example, the advertisement packet controller 203 controls a function for transmitting an advertisement packet including identification information of the electronic device 100 to another selected electronic device via a wireless communication whenever an advertisement packet transmission event is detected. Moreover, the advertisement packet controller 203 controls a function for receiving an advertisement packet from another electronic device.

When an advertisement packet is received through via the advertisement packet controller 203, the electronic device detection number controller 205 identifies identification information of the other electronic device included in the corresponding advertisement packet. In other words, when an advertisement packet is received, the electronic device detection number controller 205 cumulatively manages the number of detections of each other electronic device on the basis of identification information of the other electronic device included in the received advertisement packet. As a result of checking the identification information of the other electronic device included in the received advertisement packet, if the identification information includes a record of detection of the corresponding electronic device, the electronic device detection number controller 205 identifies the number of times the other electronic device has been detected, and then stores the number of detections after increasing the number by 1. For example, as a result of checking the ID of the other electronic device or user account information included in the advertisement packet, when it is identified that a record of detection of a first electronic device, which has transmitted the advertisement packet, exists therein and the number of detections of the first electronic device is two, the electronic device detection number controller 205 increases the number of detections of the first electronic device from two to three and then stores information indicating that the number of detections of the first electronic device is three. In contrast, as a result of checking the ID of the other electronic device or user account information included in the advertisement packet, when a record of detection of the other electronic device which has transmitted the advertisement packet does not exist therein, the electronic device detection number controller 205 stores the ID or user account information of the newly detected electronic device and stores information indicating that the number of detections of the other electronic device is one.

In addition, with reference to the time point when the number of detections of each other electronic device has been updated or cumulatively stored, the electronic device detection number controller 205 does not update or accumulate the number of detections of the corresponding electronic device within a threshold duration and controls or processes a function for updating or accumulating the number of detections of the corresponding electronic device after passage of the threshold duration. For example, in a case where an advertisement packet has been received from a particular electronic device and the number of detections of a particular electronic device has been cumulatively stored, the electronic device detection number controller 205 disregards even reception of an advertisement packet from the particular electronic device without accumulating or updating the number of detections of the particular electronic device during a threshold duration from the time point when the number of detections has been cumulatively stored, and cumulatively stores the number of detections of the particular electronic device when an advertisement packet is received from the particular electronic device after passage of the threshold duration. This is in preparation for a situation in which the electronic device 100 and the particular electronic device maintain a constant distance between them for a significant time to allow continuous transmission and reception of advertisement packets between them. For example, users of two electronic devices, who are moving a significant distance using public transportation, such as a subway train or a bus, are located within a short distance for a significant time. Therefore, the two electronic devices can continuously transmit or receive advertisement packets to or from each other. In this case, although the users of the two electronic devices actually have met only once, if the number of detections is allowed to be increased whenever an advertisement packet is received, the number of detections of each of the two electronic devices by the other party may continuously increase. In order to prevent the occurrence of such a problem, it is necessary to neglect the accumulation of the number during the threshold duration.

In an embodiment of the present invention, the electronic device detection number controller 205 increases the number of detections by 1 when the advertisement packet has been received a preset number of times. For example, when the advertisement packet has been received five times from the first electronic device, the electronic device detection number controller 205 increases the number of detections of the first electronic device by 1.

In addition, when it is identified that the number of detections of a particular electronic device is greater than or equal to a preset threshold number of times, the electronic device detection number controller 205 transmits an information transmission request message to the particular electronic device. For example, when the number of detections of a particular electronic device is greater than or equal to a preset threshold number of times, the electronic device detection number controller 205 transmits, to a server or the particular electronic device, a message requesting transmission of open information of the particular electronic device under the control of a user. Then, when the number of detections of the other electronic device is greater than or equal to a preset threshold number of times, the electronic device detection number controller 205 outputs, on a screen, information indicating the detected electronic device and the number of detections of the electronic device, and then transmits, to a server or the particular electronic device, a message requesting open information of the particular electronic device under the control of the user.

The transceiving unit 207 controls and processes a function for communicating with a server or another electronic device supporting wireless communication under the control of the controller 201. For example, the transceiving unit 207 transmits or receives an advertisement packet, an open information request message, and open information to or from another electronic device supporting wireless communication. As another example, the transceiving unit 207 transmits or receives an open information request message and open information to or from a server supporting wireless communication. Although the transceiving unit 207 is configured as one module in the present invention, a transmission unit and a reception unit may be separately configured instead of the transceiving unit 207 according to the design scheme.

The storage unit 209 stores various data and programs necessary for the operation of the electronic device 100. The storage unit 209 according to an embodiment of the present invention includes an open information storage unit 211. The open information storage unit 211 stores preset open information of the electronic device 100. In this case, the open information may be information on a user of the electronic device 100 and may have an opening grade given thereto under the control of the user. For example, the open information may be information relating to a user, such as name, age, sex, and address of the user, and may have an opening grade set for each piece of information to allow provision of only information corresponding to a particular opening grade in response to a request from a counterpart electronic device.

In an embodiment of the present invention, the open information may be advertisement information relating to the electronic device 100. For example, the open information may be information for advertising a product of a business operator relating to the electronic device 100. Further, the open information may be configured by various contents, such as a text, an image, and a video.

Further, the storage unit 209 stores a threshold number for the number of times the electronic device 100 is detected. The threshold number for the number of times the electronic device 100 is detected may be differently set according to electronic devices and may be changed by a user configuration. Further, the transceiving unit 207 stores information relating to a non-detection area and information relating to the detection area may be changed by a user configuration. For example, the non-detection area refers to an area in which the number of times the electronic device 100 is detected is not accumulated even when an advertisement packet from another electronic device is received. Further, the non-detection area may be differently configured according to the electronic devices. For example, area A may be configured to prevent accumulation of the number of detections of the first electronic device even when an advertisement packet for the first electronic device is received, and area B may be configured to allow configuration and storage of non-detection area information pertaining to each electronic device to prevent accumulation of the number of detections of the second electronic device even when an advertisement packet for the second electronic device is received. In an embodiment of the present invention, the electronic device 100 may not receive the advertisement packet by turning off the operation of a near field wireless communication module.

Further, the storage unit 209 stores information relating to a non-detection area user and the non-detection area user is changed by a user configuration. For example, users registered in a contact list of the electronic device may be configured as non-detection area users and the non-detection area user configured to be excluded from users for which the number of detections is accumulated.

Figure 3:
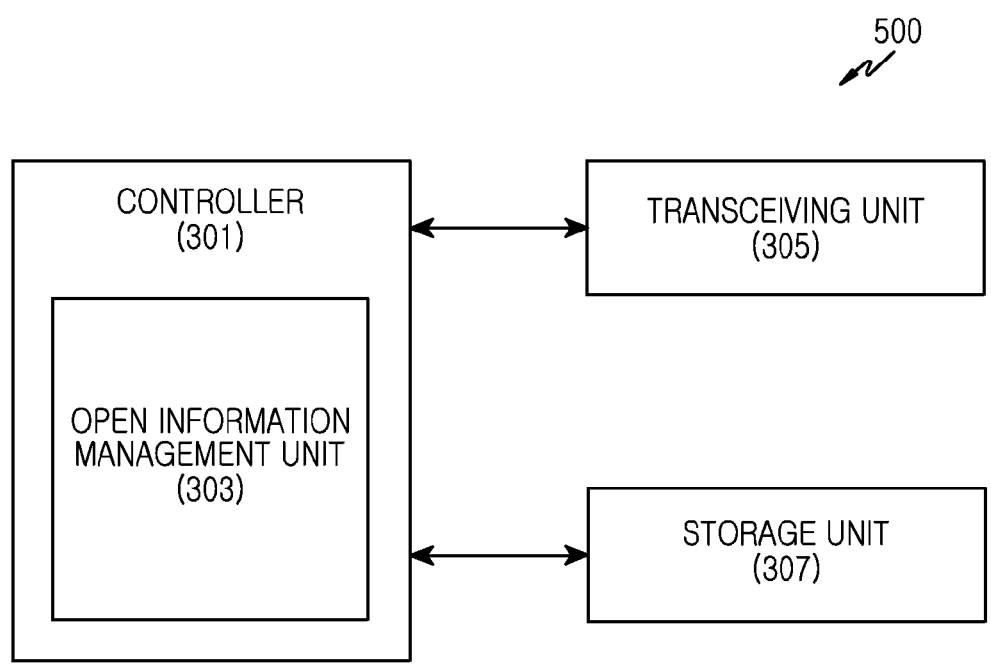
FIG. 3 is a block diagram illustrating a server providing information of an electronic device according to an embodiment of the present invention.

FIG. 3 is a block diagram illustrating a server 500 for accumulating, for each electronic device, the number of detections of another electronic device according to an embodiment of the present invention.

Referring to FIG. 3, the server 500 includes a controller 301, a transceiving unit 305, and a storage unit 307.

The controller 301 controls and processes overall operations of the user device 300 for managing open information of each electronic device. The controller 301, according to an embodiment of the present invention, includes an open information management unit 303.

The open information management unit 303 receives an open information request message from a particular electronic device and transmits open information corresponding to the corresponding request message to the particular electronic device. Then, the received open information request message includes information relating to the open information required by the electronic device having transmitted the open information request message. When the server 500 possesses the open information requested by the other electronic device, the open information management unit 303 transmits the open information to the electronic device having requested the open information. For example, when a request for open information for a first electronic device is received from a second electronic device, the open information management unit 303 determines whether open information for the first electronic device exists, and then transmits the open information to the second electronic device when the open information for the first electronic device exists. In addition, the open information management unit 303 may make a user of the second electronic device pay a price for acquisition of the open information of the first electronic device and may provide a user of the first electronic device with compensation (e.g. points or price discounts) for the provision of the open information to the second electronic device. In another embodiment of the present invention, when the open information is information for advertisement, the open information management unit 303 may provide the user of the first electronic device with compensation for viewing of the advertisement of the second electronic device.

In contrast, when the server 500 does not possess the open information requested by the other electronic device, the open information management unit 303 receives open information relating to another electronic device from the another electronic device by transmitting an open information request message to the another electronic device. Thereafter, the open information management unit 303 transmits the open information to the electronic device having requested the open information. For example, when a request for open information relating to the first electronic device is received from the second electronic device, the open information management unit 303 determines whether open information relating to the first electronic device exists. Then, when the open information relating to the first electronic device does not exist, the open information management unit 303 transmits an open information request message for the first electronic device to the first electronic device, receives the open information relating to the first electronic device from the first electronic device, and then the received open information is transmitted to the second electronic device. If the first electronic device denies to transmit the open information, the server 500 may transmit a signal notifying of the denial of the opening of the information relating to the first electronic device to the second electronic device.

In addition, the open information management unit 303 counts the total number of times a particular electronic device has detected another electronic device or the total number of other electronic devices detected a predetermined number of times or more by the particular electronic device, and provides the counted total number to another electronic device.

Further, the open information management unit 303 may manage price payment and/or compensation according to the transmission/reception of the open information between electronic devices. Further, the open information management unit 303 examines whether the open information of each electronic device includes a preset prohibitive word, and controls and processes a function for filtering the prohibitive word.

The transceiving unit 305 controls and processes a function for communicating with an electronic device supporting wireless communication under the control of the controller 301. For example, the transceiving unit 305 transmits or receives an open information request message and open information to or from an electronic device supporting wireless communication.

The storage unit 307 stores various types of data and programs required for the operations of the server 500. For example, the storage unit 307, according to an embodiment of the present invention, stores open information of each electronic device. In this case, the open information is information on a user of each electronic device and has an opening grade given thereto under the control of the user. For example, the open information is information relating to a user, such as name, age, sex, and address of the user, and has an opening grade set for each piece of information to allow provision of only information corresponding to a particular opening grade in response to a request from a counterpart electronic device. For example, when the number of times the first electronic device has detected the second electronic device is 10, information having the first grade as the opening grade among the open information of the second electronic device is provided. Further, when the number of times the first electronic device has detected the second electronic device is 20, information having the second grade as the opening grade among the open information of the second electronic device is provided. In another example, when the first electronic device has paid a particular price (e.g. charges or points) for acquiring open information corresponding to the third grade, information having the third grade as the opening grade among the open information of the second electronic device is provided. In an embodiment of the present invention, the open information may be advertisement information relating to the electronic device. For example, the open information may be information for advertising a product of a business operator relating to the electronic device. The Internet page may be configured by various contents, such as a text, an image, and a video.

Hereinafter, a process in the case where information is transmitted or received via a direct communication between electronic devices will be described with reference to FIGS. 4 to 6, and a process in the case where an electronic device 100 transmits or receives information of another electronic device 200 via a server 500 will be described with reference to FIGS. 7 to 10.

Figure 4:
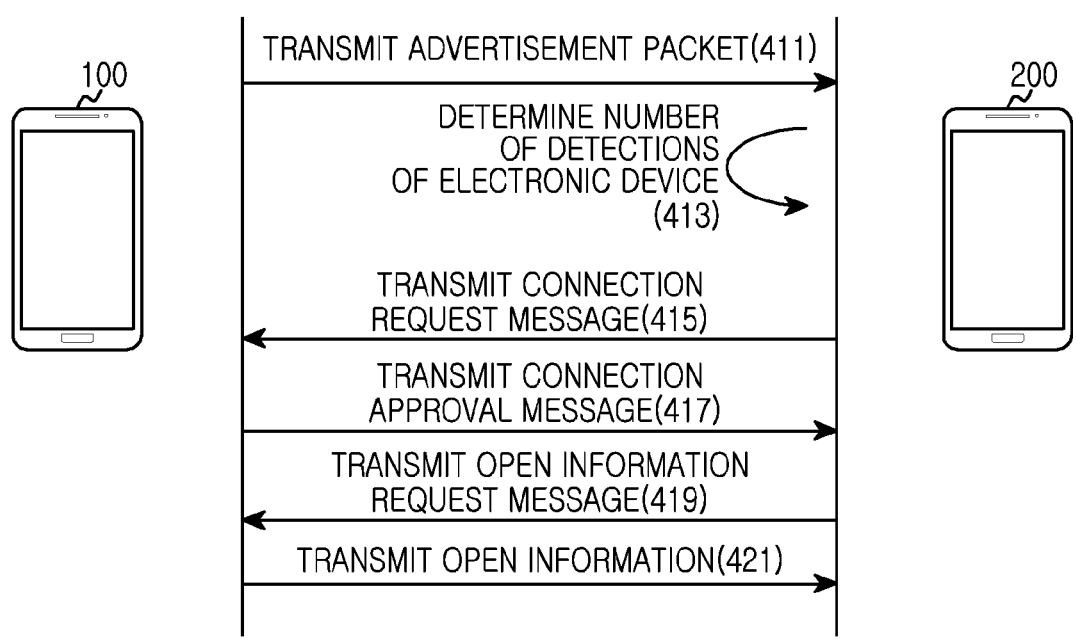
FIG. 4 is a flowchart of a process for transmitting or receiving, by an electronic device, information to or from another electronic device according to an embodiment of the present invention.

FIG. 4 is a flowchart of a process in which an electronic device 100 transmits or receives open information to or from another electronic device 200 according to an embodiment of the present invention.

Referring to FIG. 4, the electronic device 100 broadcasts an advertisement packet via a near field wireless communication in step 411. The advertisement packet includes identification information of the electronic device 100. For example, the identification information may be an identifier (ID) or user account information of the electronic device 100.

A second electronic device 200 receives the advertisement packet broadcasted by the electronic device 100 and determines the number of detections of the electronic device 100 in step 413. For example, the second electronic device 200 determines the number of detections of the electronic device 100 on the basis of the number of times the advertisement packet has been received from the electronic device 100. In this case, when the number of detections of the electronic device 100 is greater than or equal to a threshold number, the second electronic device 200 determines to collect information on the electronic device 100. Additionally, the second electronic device 200 displays information indicating that the first electronic device 100 has been detected more than the threshold number of times on a screen, and determines whether to request information on the first electronic device 100 according to control of a user.

The second electronic device 100 transmits a connection request message to the electronic device 100 in step 415 and the electronic device 100 transmits a connection approval message in step 417. Then, the electronic device 100 displays reception of the connection request message from the second electronic device 200 on the screen to determine whether to approve the connection under the control of the user, transmits a connection approval message to the second electronic device 200 when a connection approval has been determined, and transmits a connection denial message to the second electronic device 200 when a connection denial has been determined.

When the connection approval message from the electronic device 100 has been received, the second electronic device 200 transmits an open information request message to the electronic device 100 in step 419, and the electronic device 100 transmits open information to the second electronic device 200. In this case, the electronic device 100 displays, on a screen, information indicating there is a request for transmission of open information from the second electronic device 200, so as to determine open information to be transmitted or determine whether to transmit open information according to control of the user. For example, the electronic device 100 classifies multiple pieces of open information of the user into multiple grades according to control of the user and transmits only open information corresponding to a certain grade to the second electronic device 200.

Figure 5:
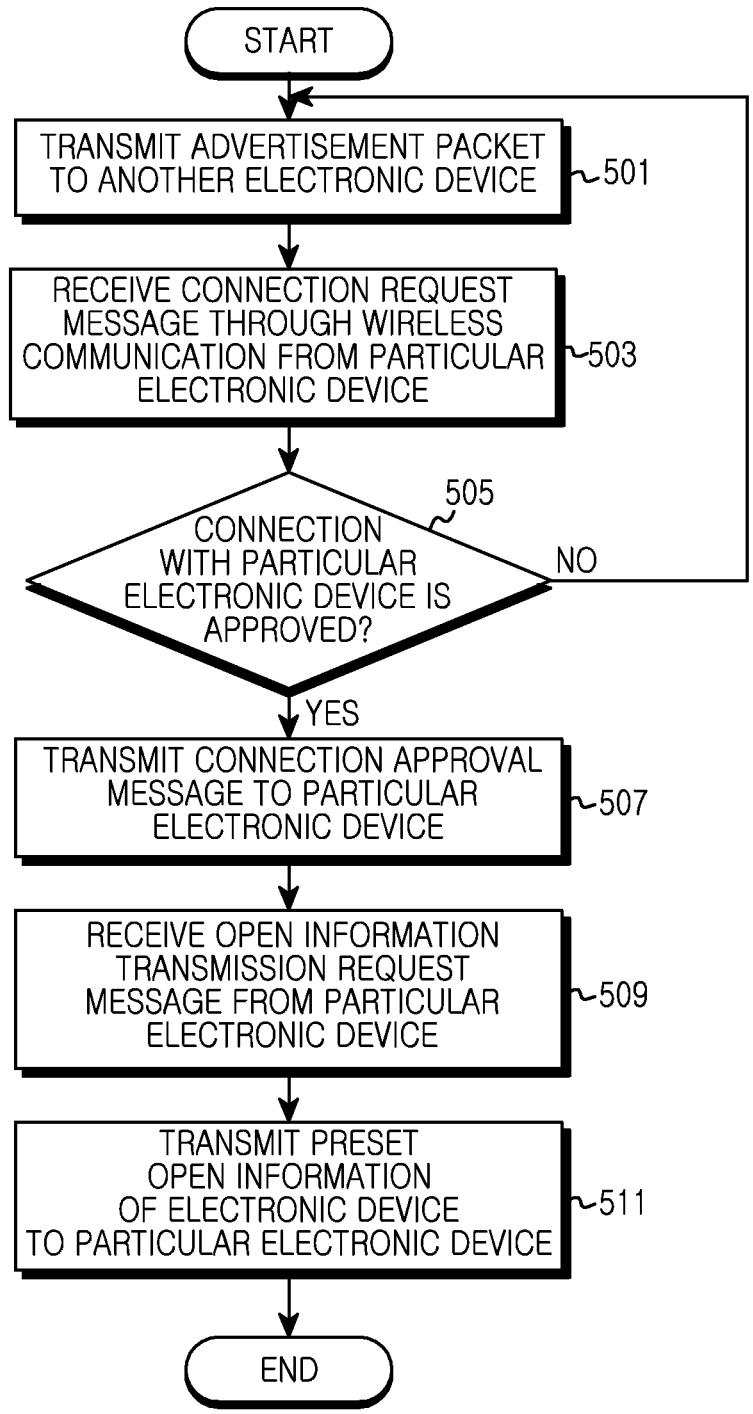
FIG. 5 is a flowchart of a process for transmitting information from an electronic device to another electronic device according to an embodiment of the present invention.

FIG. 5 is a flowchart of a process for transmitting information from an electronic device 100 to another electronic device according to an embodiment of the present invention.

Referring to FIG. 5, the electronic device 100 transmits an advertisement packet to another electronic device in step 501. The advertisement packet may be transmitted at every cycle of a preset cycle via a near field wireless communication scheme and includes an ID or user account information of the electronic device 100.

Then, the electronic device 100 receives a connection request message via wireless communication from a particular electronic device in step 503, and determines whether to approve a connection with the particular electronic device in step 505. For example, the electronic device 100 displays, on a screen, information that reports reception of the connection request message from the particular electronic device and inquires about whether to approve the connection with the particular electronic device, so as to determine whether to approve the connection with the particular electronic device according to control of a user. If it is determined to deny to connect with the particular electronic device, the electronic device 100 returns to step 501 and re-performs step 501.

In contrast, when it is determined to approve the connection with the particular device, the electronic device 100 transmits a connection approval message to the particular electronic device in step 507. Then, the electronic device 100 receives an open information transmission request message from the particular electronic device in step 509. In this case, the electronic device 100 displays, on a screen, information that inquires about whether to transmit open information while reporting a request for transmission of open information from the particular electronic device, so as to determine whether to transmit the open information according to control of the user. Further, the electronic device 100 determines the type or grade of information to be opened to the particular electronic device.

Then, the electronic device 100 proceeds to step 511, in which the electronic device 100 transmits preset open information of the electronic device 100 to the particular electronic device. According to an embodiment of the present invention, the electronic device 100 may receive payment of compensation for the transmission of the open information to the particular electronic device.

Then, the electronic device 100 terminates the process according to an embodiment of the present invention.

Figure 6:
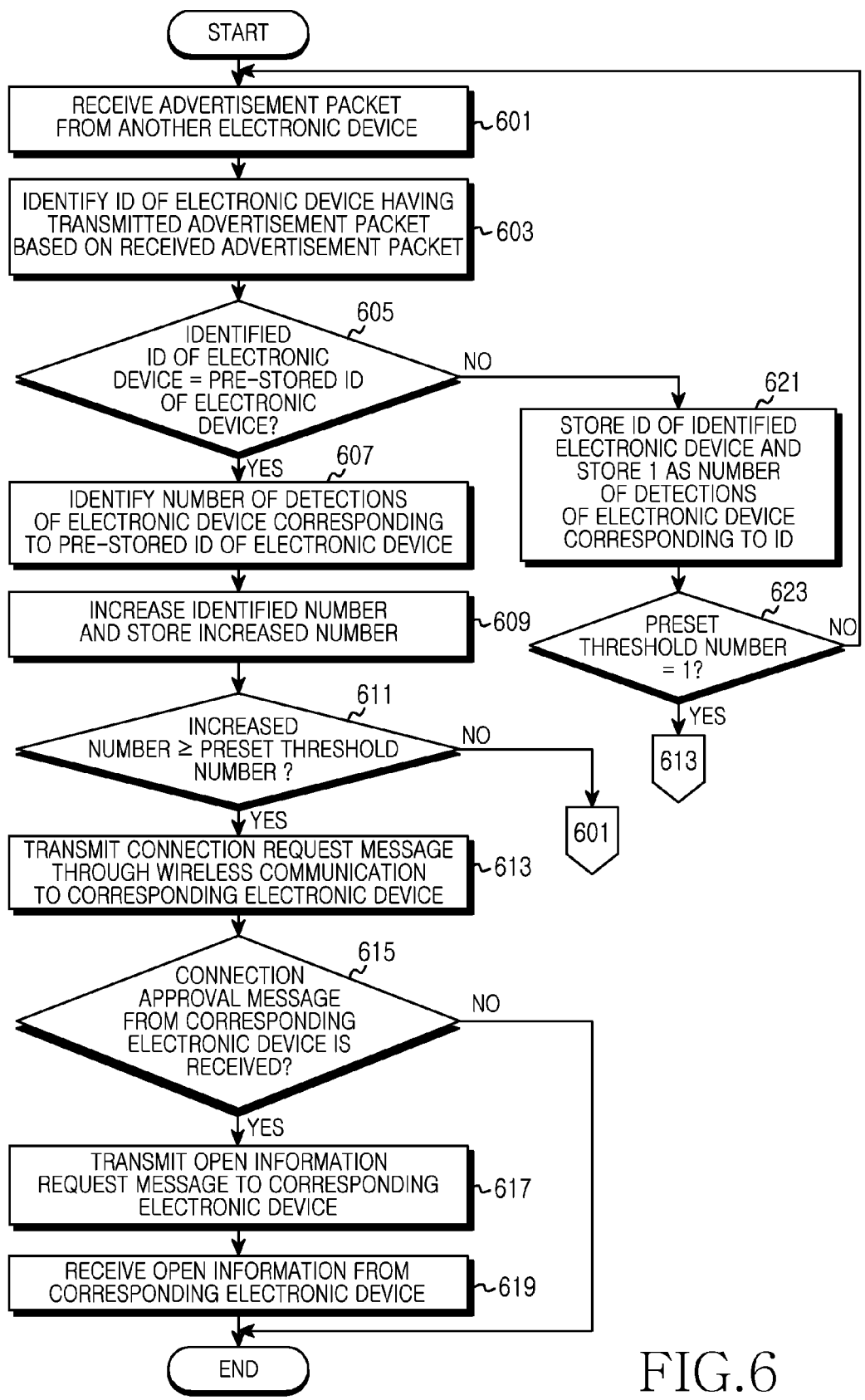
FIG. 6 is a flowchart of a process for receiving, by an electronic device, information from another electronic device according to an embodiment of the present invention.

FIG. 6 is a flowchart of a process for receiving, by an electronic device 100, information from another electronic device according to an embodiment of the present invention.

Referring to FIG. 6, the electronic device 100 receives an advertisement packet from another electronic device in step 601. The electronic device 100 broadcasts an advertisement packet to other electronic devices at every cycle of a preset cycle.

In step 603, the electronic device 100 identifies an ID of the another electronic device having transmitted the advertisement packet on the basis of the received advertisement packet. In this case, the electronic device 100 identifies the ID of the another electronic device by analyzing the advertisement packet only when the reception signal intensity of the advertisement packet is greater than or equal to a threshold value. When the reception signal intensity of the advertisement packet is less than the threshold value, the electronic device 100 disregards the advertisement packet. In addition, on the basis of information on a non-detection area and non-detection area user information, the electronic device 100 determines whether to identify an ID of the another electronic device from a corresponding packet or whether to accumulate the number of detections of the identified electronic device.

In step 605, the electronic device 100 compares the identified ID of the another electronic device with an ID of the electronic device pre-stored in the storage unit. When the identified ID of the another electronic device coincides with the ID of the electronic device pre-stored in the storage unit, the electronic device 100 determines that the corresponding electronic device is an electronic device which has been previously detected, and proceeds to step 607 in which the electronic device identifies the number of detections of the electronic device corresponding to the pre-stored ID. Then, in step 609, the electronic device 100 increases the identified number of detections and stores the increased number of detections. Then, the electronic device 100 examines whether the increased number of times is greater than or equal to a preset threshold number. When the increased number of times is less than the preset threshold number, the electronic device 100 returns to step 601 and then re-performs step 601. When the increased number of times is greater than or equal to the preset threshold number, the electronic device 100 proceeds to step 613 in which the electronic device 100 transmits a connection request message via wireless communication to the corresponding electronic device. In this case, the electronic device 100 displays, on a screen, information reporting that the another electronic device having the identified ID has been detected more than a preset threshold number of times, and inquires of the user about whether to request the another electronic device having the identified ID to transmit information.

In step 615, the electronic device 100 examines whether a connection approval message from the corresponding electronic device is received. When a connection approval message from the corresponding electronic device is not received, e.g. when a connection denial message is received, the electronic device 100 displays a message reporting that the corresponding electronic device has denied connection and/or transmission of information on a screen, and then terminates the process according to the present invention.

In contrast, when a connection approval message is received, the electronic device 100 transmits an open information request message to the corresponding electronic device in step 617, and then receives open information from the corresponding electronic device in step 619. The electronic device 100 displays the open information received from the corresponding electronic device on a screen, and then terminates the process according to the present invention.

Meanwhile, as a result of the comparison in step 605, when the identified ID of the another electronic device does not coincide with an ID of an electronic device pre-stored in the storage unit, the electronic device 100 determines that the corresponding electronic device is a new electronic device which has never been previously detected, and stores an ID of the identified electronic device and stores one as the number of times the electronic device corresponding to the ID has been detected, in step 621. Then, in step 623, the electronic device 100 determines whether the preset threshold number of times is 1. When the preset threshold number of times is not 1, the electronic device 100 returns to step 601 and then re-performs step 601. In contrast, when the preset threshold number of times is 1, the electronic device 100 proceeds to step 613 and then performs step 613.

The process described above with reference to FIGS. 4 to 6 corresponds to a case where the second electronic device 200 having detected the electronic device 100 more than a threshold number of times requests connection with the electronic device 100 and requests the electronic device 100 to transmit open information. However, according to an embodiment of the present invention, the second electronic device 200 having detected the electronic device 100 more than a threshold number of times provides information to the electronic device 100. For example, the second electronic device 200 notifies the electronic device 100 that the second electronic device 200 wants to transmit contents for advertisement to the electronic device 100, and transmits advertisement contents to the electronic device 100 when the electronic device 100 approves the transmission.

Figure 7:
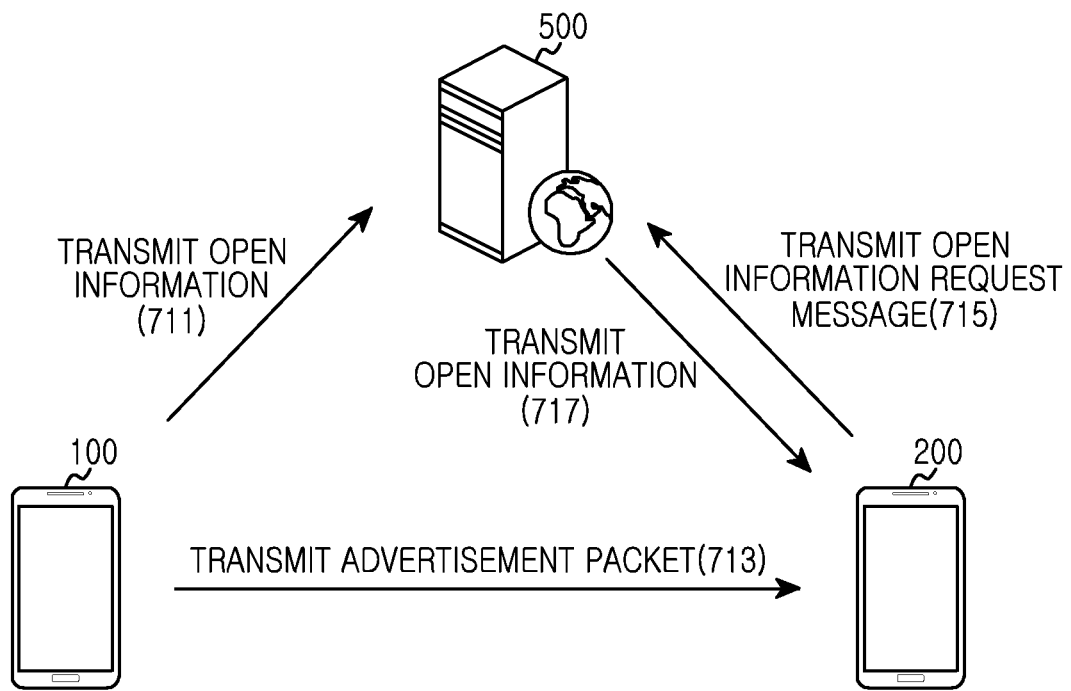
FIG. 7 illustrates a process in which an electronic device 100 transmits or receives information to or from another electronic device via a server according to an embodiment of the present invention.

FIG. 7 illustrates a process in which an electronic device 100 transmits or receives information to or from another electronic device 200 via a server 500 according to an embodiment of the present invention.

Referring to FIG. 7, a first electronic device 100 transmits open information to a server 500 in step 711. For example, the first electronic device 100 previously registers information openable to a user in the server 500. In this case, the open information may include multiple pieces of information having different opening grades. Thereafter, the first electronic device 100 broadcasts an advertisement packet via a near field wireless communication in step 713. The advertisement packet may include identification information of the first electronic device 100. For example, the identification information may be an ID or user account information of the first electronic device 100.

The second electronic device 200 receives the advertisement packet broadcasted by the first electronic device 100 and determines the number of detections of the first electronic device 100. For example, the second electronic device 200 may determine the number of detections of the first electronic device 100 on the basis of the number of times the advertisement packet has been received from the first electronic device 100. In this case, when the number of detections of the first electronic device 100 is greater than or equal to a threshold number, the second electronic device 200 displays, on a screen, information reporting that the first electronic device 100 has been detected more than the threshold number of times, to determine whether to request information on the first electronic device 100. When it is determined to request information on the first electronic device 100, the second electronic device 200 transmits, to the server 500, a message for requesting transmission of open information of the first electronic device 100. Then, the open information request message includes the number of detections of the first electronic device 100 and opening request grade information. In addition, the second electronic device 200 may pay the price for acquisition of open information of the first electronic device 100. In this case, the price for acquisition of open information may be different according to the opening grades.

When receiving an open information request message relating to the first electronic device 100 from the second electronic device 200, the server 500 transmits pre-stored open information of the first electronic device 100 to the second electronic device 200. Here, the server 500 transmits open information of the first electronic device 100 corresponding to the number of detections or open information grade requested by the second electronic device 200 or pays compensation for the transmission of the open information to the first electronic device 100.

Further, on the basis of the open information request message received from electronic devices, the server 500 calculates the total number of electronic devices having requested open information of a particular electronic device and collects identification information of the electronic devices having requested open information of the particular electronic device, and may use the calculated and collected information to recommend the information, which a plurality of electronic devices are interested in, to other electronic devices.

Figure 8:
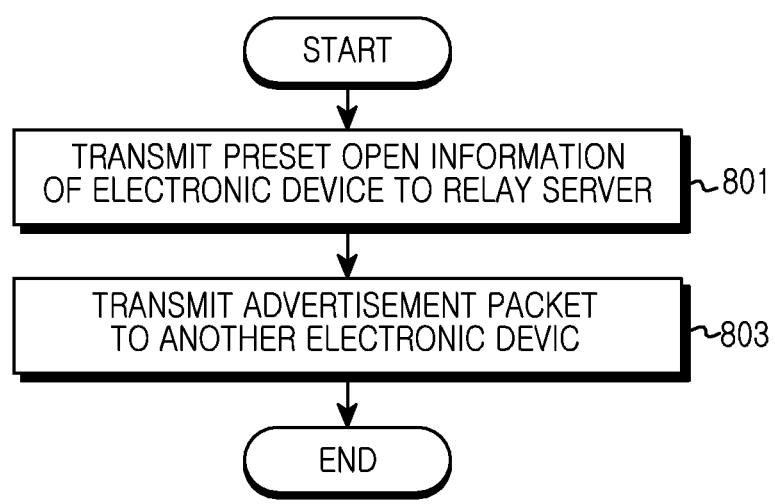
FIG. 8 is a flowchart of a process for transmitting information from an electronic device to another electronic device via a server according to an embodiment of the present invention.

FIG. 8 is a flowchart of a process for transmitting information from an electronic device 100 to another electronic device via a server 500 according to an embodiment of the present invention.

Referring to FIG. 8, an electronic device 100 transmits open information preset by a user to a relay server 500 in step 801. In this case, the open information may be user-related information or information for advertisement and may include multiple pieces of information having different opening grades. The open information may include various types of contents, such as a text, an image, a video, and a music file.

Then, in step 803, the electronic device 100 transmits an advertisement packet to another electronic device at every cycle of a preset cycle. The advertisement packet may include identification information of the electronic device 100. For example, the identification information may include an ID or user account information of the electronic device 100.

Then, the electronic device 100 terminates the process according to the present invention.

Figure 9:
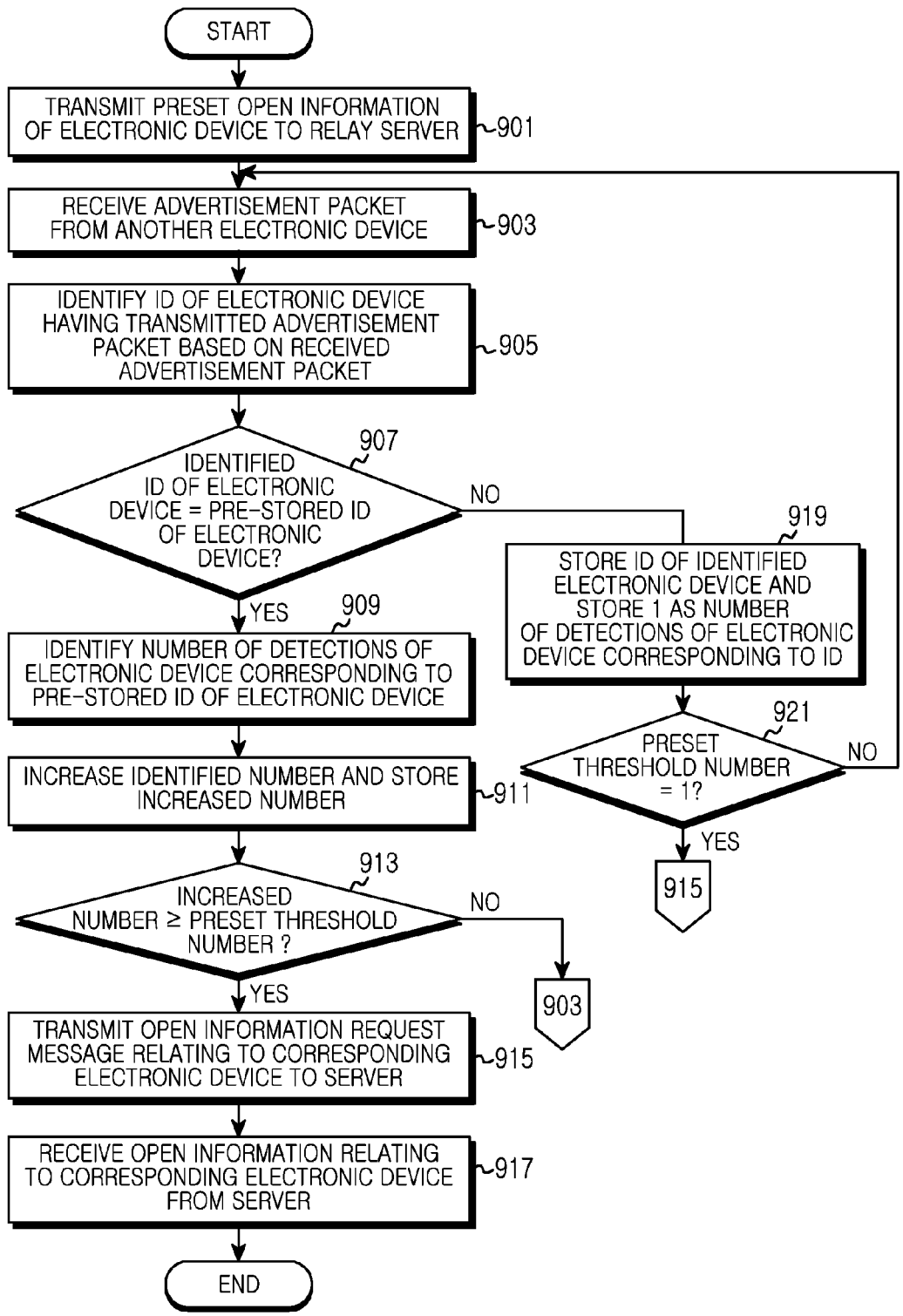
FIG. 9 is a flowchart of a process for receiving open information from another electronic device via a server by an electronic device according to an embodiment of the present invention.

FIG. 9 is a flowchart of a process for receiving open information from another electronic device via a server 500 by an electronic device 100 according to an embodiment of the present invention.

Referring to FIG. 9, an electronic device 100 transmits open information preset by a user to a relay server 500 in step 901. In this case, the open information may be user-related information or information for advertisement and may include multiple pieces of information having different opening grades. The open information may include various types of contents, such as a text, an image, a video, and a music file.

Then, the electronic device 100 receives an advertisement packet from another electronic device in step 903. The electronic device 100 may broadcast an advertisement packet to other electronic devices at every cycle of a preset cycle.

In step 905, the electronic device 100 identifies an ID of the other electronic device having transmitted the advertisement packet on the basis of the received advertisement packet. In this case, the electronic 100 device identifies the ID of the other electronic device by analyzing the advertisement packet only when the reception signal intensity of the advertisement packet is greater than or equal to a threshold value. When the reception signal intensity of the advertisement packet is less than the threshold value, the electronic device 100 disregards the advertisement packet. In addition, on the basis of information on a non-detection area and non-detection area user information, the electronic device 100 determines whether to identify an ID of an electronic device from a corresponding packet or whether to accumulate the number of detections of the identified electronic device.

In step 907, the electronic device 100 compares the identified ID of the electronic device with an ID of the electronic device pre-stored in the storage unit. When the identified ID of the electronic device coincides with the ID of the electronic device pre-stored in the storage unit, the electronic device 100 determines that the corresponding electronic device is an electronic device which has been previously detected, and proceeds to step 909 in which the electronic device 100 identifies the number of detections of the electronic device corresponding to the pre-stored ID. Then, in step 911, the electronic device 100 increases the identified number of detections and stores the increased number of detections. Then, in step 913, the electronic device 100 examines whether the increased number of times is greater than or equal to a preset threshold number. When the increased number of times is less than the preset threshold number, the electronic device 100 returns to step 903 and then re-performs step 903. When the increased number of times is greater than or equal to the preset threshold number, the electronic device 100 proceeds to step 915 in which the electronic device 100 transmits an open information request message relating to the corresponding electronic device to the server 500. In this case, the electronic device 100 displays, on a screen, information reporting that the electronic device having the identified ID has been detected more than a preset threshold number of times, and inquires of the user about whether to request transmission of information on the electronic device having the identified ID. Further, the electronic device 100 determines the grade of the open information which the electronic device wants to receive from the corresponding electronic device, and requests the server to transmit the information corresponding to the determined grade. In addition, the electronic device 100 may pay a price for the acquisition of the open information relating to the corresponding electronic device to the server 500.

In step 917, the electronic device 100 receives the open information relating to the corresponding electronic device from the server 500. The electronic device 100 displays the open information received from the corresponding electronic device on a screen, and then terminates the process according to the present invention.

In addition, as a result of the comparison in step 907, when the identified ID of the electronic device does not coincide with the ID of the electronic device pre-stored in the storage unit, the electronic device 100 determines that the corresponding electronic device is a new electronic device which has never been previously detected, and stores an ID of the identified electronic device and stores one as the number of times the electronic device corresponding to the ID has been detected, in step 919. Then, in step 921, the electronic device 100 determines whether the preset threshold number of times is 1. When the preset threshold number of times is not 1, the electronic device 100 returns to step 903 and then re-performs step 903. In contrast, when the preset threshold number of times is 1, the electronic device 100 proceeds to step 915 and then performs the operation of step 915.

Figure 10:
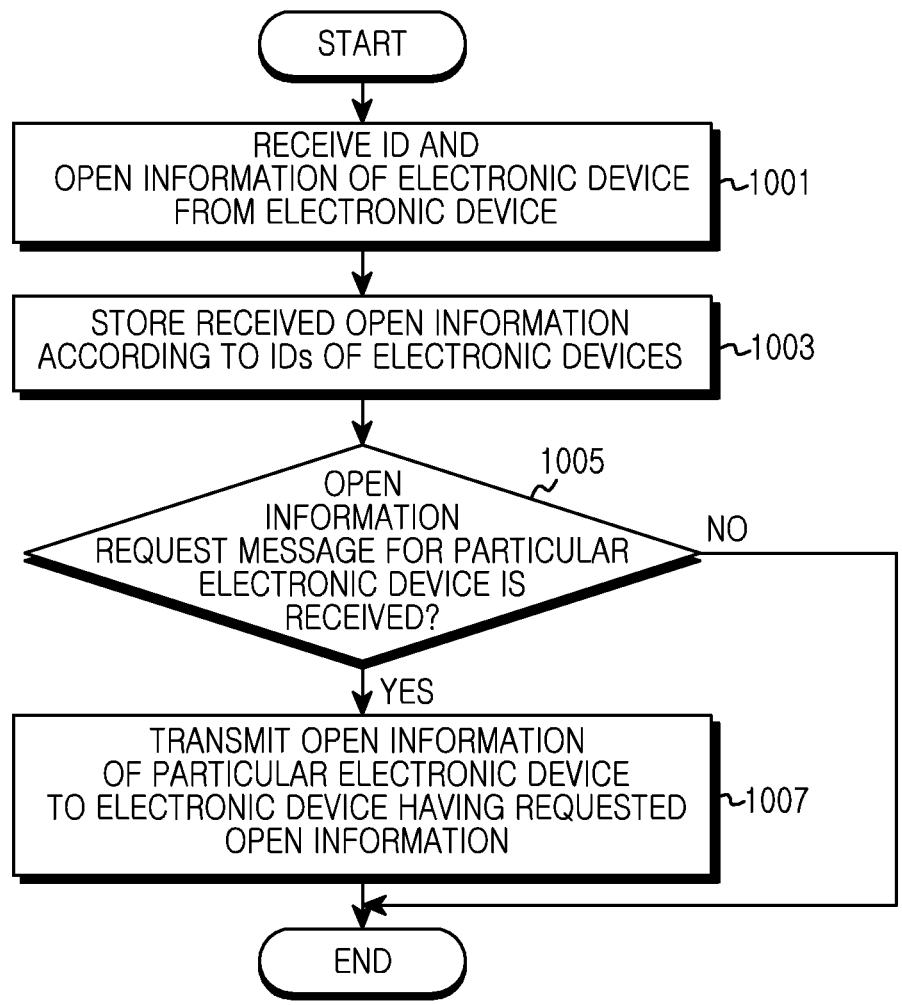
FIG. 10 is a flowchart of a process for transferring open information of an electronic device by a server according to an embodiment of the present invention.

FIG. 10 is a flowchart of a process for transferring open information of an electronic device by a server 500 according to an embodiment of the present invention.

Referring to FIG. 10, the server 500 receives ID information and open information of a corresponding electronic device from a particular electronic device in step 1001 and stores the received open information after mapping the received open information to ID information of the corresponding electronic device in step 1003. In an embodiment of the present invention, the server 500 receives user account information and open information of an electronic device and then stores the user account information and the open information after mapping them to each other.

Then, in step 1005, the server 500 determines whether an open information request message for a particular electronic device is received from another electronic device. When an open information request message for a particular electronic device is not received, the server 500 terminates the process according to the present invention.

In contrast, when an open information request message for a particular electronic device is received, the server 500 transmits open information of the particular electronic device to another electronic device having requested the open information in operation 1007. In this case, when the open information request message includes grade information relating to the open information, the server 500 transmits only information corresponding to the requested grade among the open information of the particular electronic device. Further, the server 500 may receive a price for transmission of the open information paid by another electronic device having requested the open information of the particular electronic device and provide compensation for transmission of the open information to the particular electronic device. Additionally, the server 500 transmits, to the particular electronic device, a message reporting that the server has transmitted the open information of the particular electronic device to another electronic device.

Then, the server 500 terminates the process according to the present invention.

Figure 11A:
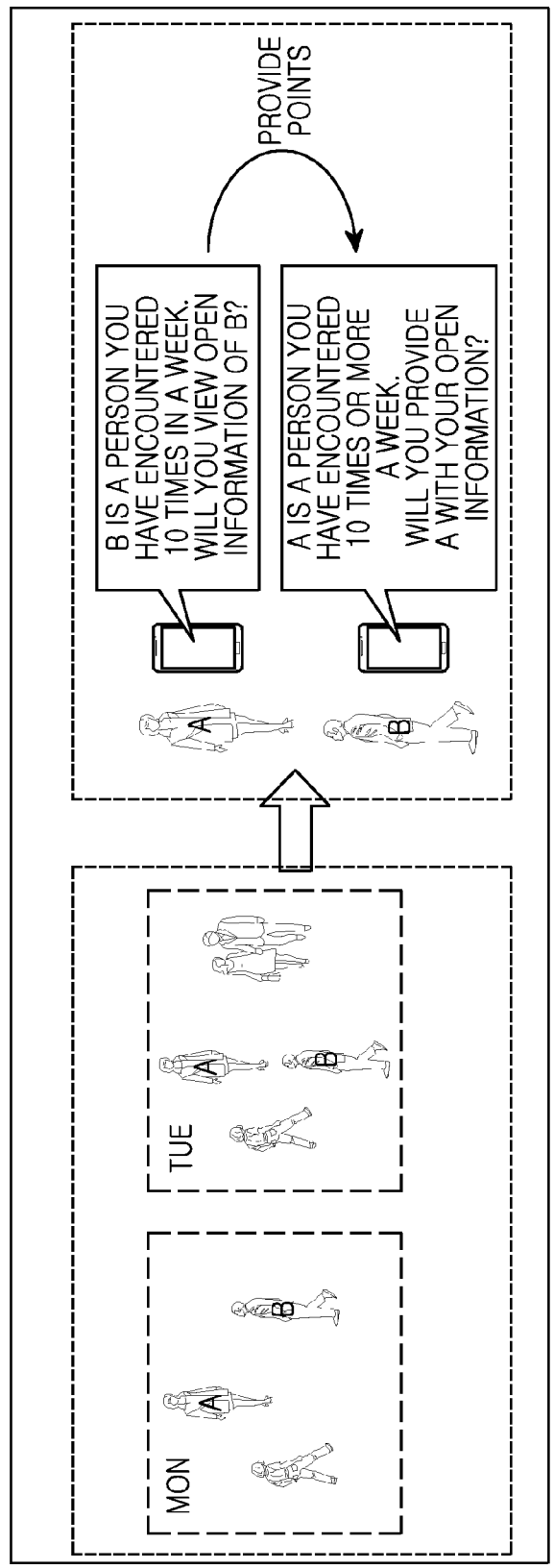
FIGS. 11A to 11C illustrate an example in which open information can be used based on a number of detections of an electronic device according to an embodiment of the present invention.
Figure 11B:
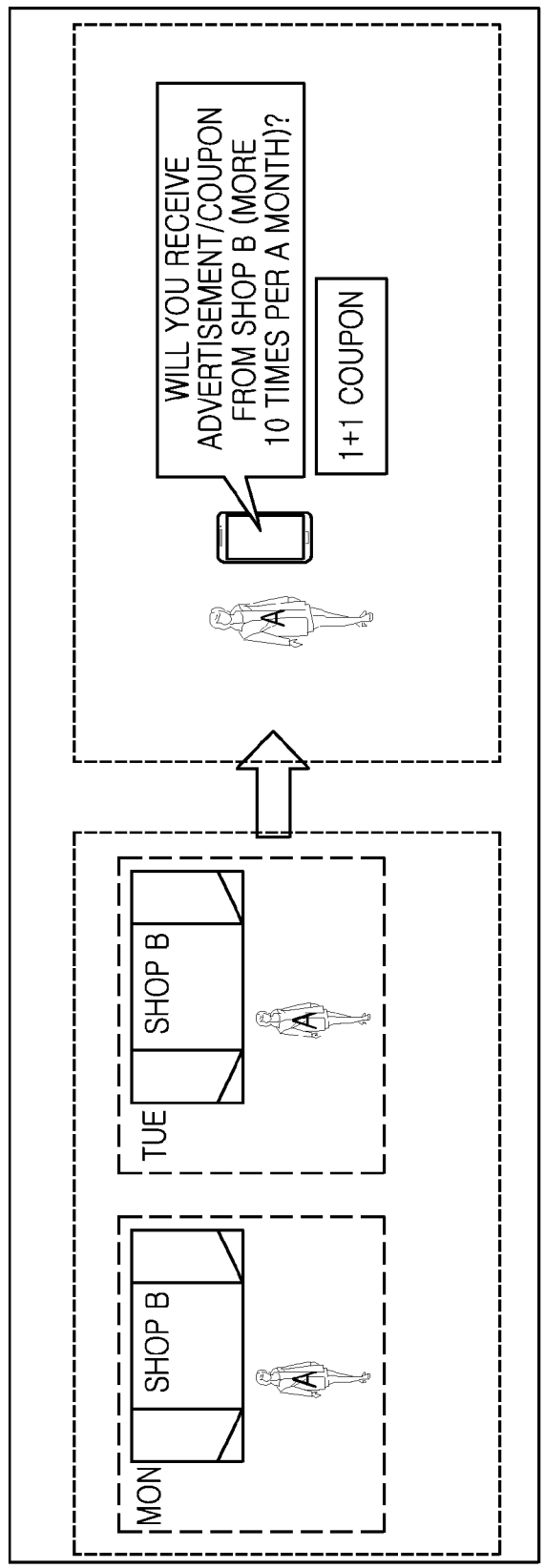
Figure 11C:
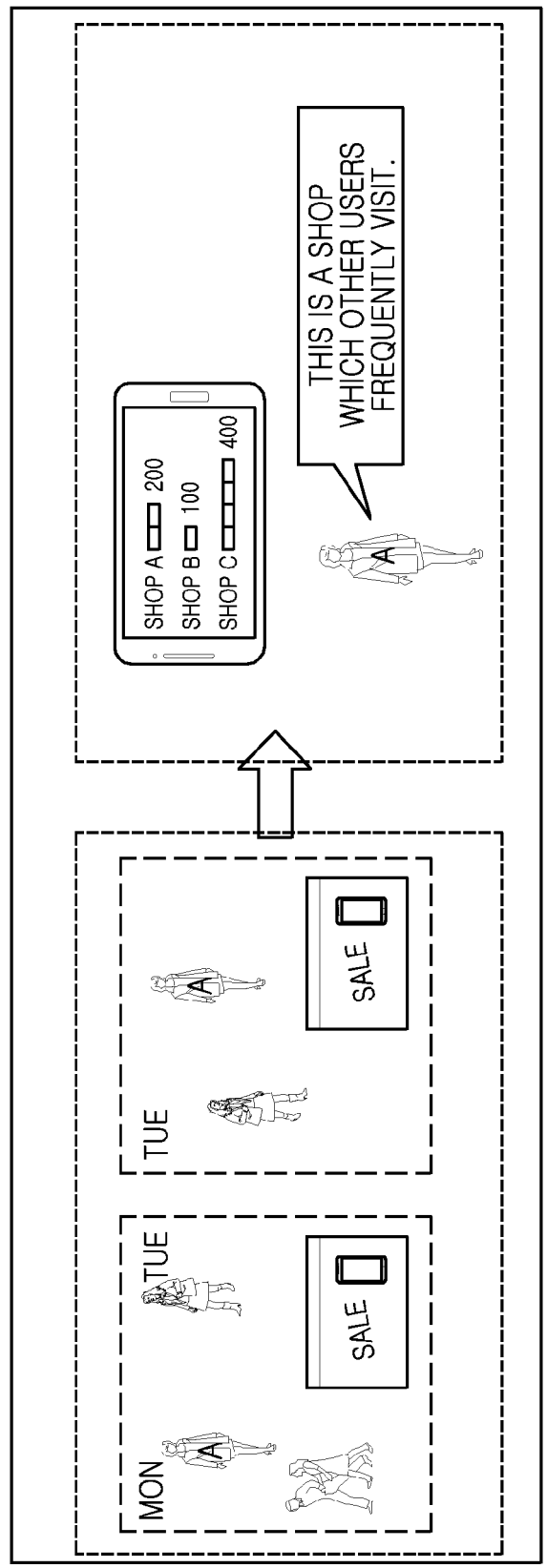

FIGS. 11A to 11C illustrate an example in which open information can be used based on a number of detections of an electronic device according to an embodiment of the present invention.

As shown in FIG. 11A, user A encounters user B multiple times during one week. In this case, when the number of times user A has encountered user B becomes greater than or equal to 10, which signifies that user A has encountered user B 10 times or more during one week, an electronic device of user A displays, on a screen, a message inquiring about whether user A wants to view open information of user B. When user A wants to view open information of user B, the electronic device of user A requests transmission of open information of user B. An electronic device of user B displays a message reporting that there is a request for transmission of open information from user A which user B has encountered 10 times or more during one week. When user A approves transmission of open information, the electronic device of user B transmits the open information of user B to the electronic device of user A. In this event, the electronic device of user A may provide particular points (or expense) to the electronic device of user B as a price for the transmission of the open information of the electronic device of user B.

As shown in FIG. 11B, user A visits or passes by the same shop multiple times during one month. In this case, when the number of times user A has visited or passed by a particular shop becomes greater than or equal to 15, which signifies that user A has visited or passed by the particular shop 15 times or more during one month, an electronic device of user A displays, on a screen, a message inquiring about whether user A wants to receive advertisement and/or a coupon of the particular shop. When user A wants to receive advertisement and/or a coupon of the particular shop, the electronic device of user A requests the server to provide advertisement and/or a coupon of the particular shop. Then, an electronic device of the particular shop or the server transmits a pre-registered advertisement and/or coupon to the electronic device of user A.

As shown in FIG. 11C, user A encounters various users according to user A's routine. In this case, user A receives information on a shop which users, whom user A has encountered a predetermined number of times or more, frequently visit. As another example, user A visits or passes by various shops according to user A's routine. In this case, user A acquires information on the number of times other users have visited the shop which user A has visited or passed by, or information on the number of visitors of the shop.

Embodiments and all functional operations described in the present invention may be carried out by computer software, firmware, hardware, or one or more combinations thereof, which include the structures disclosed in the present invention and equivalent structures thereof. Further, embodiments of the present invention described in the present invention may be executed by one or more computer program products, e.g. data processing devices, or carried out by one or more modules of computer program commands encoded in non-transitory computer-readable media for controlling the operations of the devices.

A non-transitory computer-readable medium may be a machine-readable storage medium, a machine-readable storage substrate, a memory device, a configuration of a material influencing a machine-readable electrical wave stream, or one or more combinations thereof. The term "data processing device" includes, for example, a programmable processor, a computer, or all nodes, devices, and machines, including a multi-processor or computer, for processing data. The node may include, in addition to hardware, a code that creates an execution environment for a computer program, for example, a code that constitutes processor firmware, a protocol stack, a database management system, an operating system, or one or more combinations thereof.

Although embodiments have been described in the detailed description of the present disclosure, various changes and modifications may be made without departing from the scope and spirit of the present invention. Therefore, the scope of the present invention should not be interpreted as being limited to the described embodiments, but is defined by the appended claims and equivalents thereof.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

What is claimed is:

1. A method of an electronic device, the method comprising:
    receiving a broadcast signal broadcast by another electronic device via a wireless communication;
    acquiring identification information of the another electronic device from the broadcast signal;
    determining, based on the identification information, a number of detections of the another electronic device by updating the number of detections of the another electronic device when identifying that the another electronic device is entering a predetermined range from the electronic device; and
    transmitting a request for information to the another electronic device, based on the number of detections of the another electronic device.

2. The method of claim 1, wherein transmitting the request for information to the another electronic device, based on the number of detections of the another electronic device comprises:
    comparing the number of detections of the another electronic device with a preset value; and
    when the number of detections of the another electronic device has exceeds the preset value, transmitting a request for information to at least one of the another electronic device and a server.

3. The method of claim 2, wherein transmitting the request for information to at least one of the another electronic device and the server comprises:
    transmitting a request for connection with the another electronic device; and
    when the request for connection with the another electronic device is approved, connecting with the another electronic device and requesting information on the another electronic device.

4. The method of claim 1, wherein determining, based on the broadcast signal, the number of detections of the another electronic device comprises:
    measuring a reception signal intensity of the broadcast signal; and
    when the measured reception signal intensity is greater than or equal to a threshold reception signal intensity, determining, based on the broadcast signal, the number of detections of the another electronic device.

5. The method of claim 1, wherein the determining, based on the received broadcast signal, the number of detections of the another electronic device comprises:
    determining whether the another electronic device corresponds to a preset non-detection area, based on the acquired identification information; and
    increasing the number of detections of the another electronic device when the another electronic device does not correspond to the preset non-detection area.

6. The method of claim 1, wherein determining, based on the broadcast signal, the number of detections of the another electronic device comprises:
    determining whether a location of the electronic device belongs to a non-detection area; and
    increasing the number of detections of the another electronic device when the location of the electronic device does not belong to the non-detection area.

7. The method of claim 1, further comprising:
    determining whether a location of the electronic device belongs to a non-detection area,
    wherein a wireless communication module used for reception of the broadcast signal is on to receive the broadcast signal broadcast from the another electronic device when the location of the electronic device does not belong to the non-detection area, and the wireless communication module is off when the location of the electronic device belongs to the non-detection area.

8. The method of claim 1, wherein transmitting to the another device, the request for information based on the number of detections of the another electronic device comprises:
    displaying the number of detections of the another electronic device and a message inquiring about whether to transmit a request for information on the another electronic device; and
    transmitting a request for information on the another electronic device based on a user's input responsive to the display of the message.

9. The method of claim 1, wherein the number of detections of the another electronic device is maintained within a predetermined duration after the number of detections of the another electronic device is determined.

10. The method of claim 1, wherein determining, based on the identification information, the number of detections of the another electronic comprises determining, based on the identification information, a number of times that the electronic device has detected a particular location, and
    wherein the method further comprises receiving information on the particular location.

11. The method of claim 1, further comprising:
    transmitting a broadcast signal comprising information on the number of detections of the another electronic device.

12. A method of a server, the method comprising:
    receiving information from a first electronic device;
    receiving, from a second electronic device, an information request message relating to the first electronic device which has been detected a threshold number of times or more by the second electronic device; and transmitting information registered by the first electronic device to the second electronic device.

13. The method of claim 12, wherein transmitting information registered by the first electronic device to the second electronic device comprises:
identifying, in a message received from the second electronic device, a number of times the second electronic device has detected the first electronic device; and
selectively transmitting the information registered by the first electronic device, based on the detected number of times.

14. An electronic device, comprising:
a transceiving unit configured to receive a broadcast signal broadcast by another electronic device; and
a controller configured to acquire identification information of the another electronic device from the broadcast signal, and determine, based on the identification information, a number of detections of the another electronic device by updating the number of detections of the another electronic device when identifying that the another electronic device is entering a predetermined range from the electronic device,
wherein the transceiving unit is further configured to transmit, to the another electronic device, a request for information on the another electronic device, based on the number of detections of the another electronic device.

15. The electronic device of claim 14, wherein the controller is further configured to compare the determined number of detections of the another electronic device to a preset threshold value, and
wherein the transceiving unit is further configured to transmit a request for information to one of the another electronic device and a server when the determined number of detections of the another electronic device exceeds the preset value.

16. The electronic device of claim 14, wherein the controller is further configured to control a wireless communication unit to transmit a request for connection with the another electronic device, and to control the wireless communication unit to connect with the another electronic device and request information on the another electronic device when the request for connection with the another electronic device is approved.

17. The electronic device of claim 14, wherein the controller is further configured to measure the reception signal intensity of the broadcast signal and to determine the number of detections of the another electronic device, based on the received broadcast signal, when the measured reception signal intensity is greater than or equal to a threshold reception signal intensity.

18. The electronic device of claim 14, wherein the controller is further configured to determine whether the another electronic device corresponds to a preset non-detection area, based on the acquired identification information, and increase, by 1, the number of detections of the another electronic device when the another electronic device does not correspond to a preset non-detection area.

19. The electronic device of claim 14, wherein the controller is further configured to determine whether the location of the electronic device belongs to a non-detection area, to increase the number of detections of the another electronic device has been detected when the location of the electronic device does not belong to the non-detection area.

20. The electronic device of claim 14, wherein the controller is further configured to determine whether the location of the electronic device belongs to a non-detection area, and turn on a wireless communication module used for reception of the broadcast signal to receive the broadcast signal broadcast from the another electronic device when the location of the electronic device does not belong to the non-detection area.

21. The electronic device of claim 14, wherein the controller is further configured to display the number of detections of the another electronic device and a message inquiring about whether to transmit a request for information on the another electronic device, and to control the wireless communication unit to transmit a request for information on the another electronic device according to a control of a user.

22. The electronic device of claim 14, wherein the number of detections of the another electronic device is maintained within a predetermined duration after the number of detection of the another electronic device is determined.

23. The electronic device of claim 14, wherein the controller is further configured to determine, based on the identification information, a number of times that the electronic device has detected a particular location, and
wherein the transceiving unit is further configured to receive information on the particular location.

24. The electronic device of claim 14, wherein the transceiving unit is further configured to transmit a broadcast signal comprising information on the number of detections of the another electronic device.

25. An apparatus of a server, the apparatus comprising:
a communication module configured to receive information from a first electronic device, and to receive, from a second electronic device, an information request message relating to the first electronic device which has been detected a threshold number of times or more by the second electronic device; and
a controller configured to control a wireless communication unit to transmit information registered by the first electronic device to the second electronic device.

26. The apparatus of claim 25, wherein the controller is further configured to identify, in the information request message received from the second electronic device, a number of times the second electronic device has detected the first electronic device, and to control the wireless communication unit to selectively transmit the information registered by the first electronic device, based on the detected number of times.

* * * * *